US010146219B2

(12) United States Patent
Selvaraj et al.

(10) Patent No.: US 10,146,219 B2
(45) Date of Patent: Dec. 4, 2018

(54) SYSTEMS AND METHODS FOR PROCESSING AND GRAPHICALLY DISPLAYING POWER PLANT DATA

(71) Applicant: General Electric Company, Schenectady, NY (US)

(72) Inventors: Venkatesh Mani Selvaraj, Andhra Pradesh (IN); Nagesh Laxminarayana Kurella, Andhra Pradesh (IN); Rohan Saraswat, Andhra Pradesh (IN); Veera Paparao Bolla, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 708 days.

(21) Appl. No.: 14/138,922

(22) Filed: Dec. 23, 2013

(65) Prior Publication Data

US 2015/0177936 A1 Jun. 25, 2015

(51) Int. Cl.
*G05B 23/00* (2006.01)
*G05B 23/02* (2006.01)

(52) U.S. Cl.
CPC ......... *G05B 23/0272* (2013.01); *Y04S 10/522* (2013.01)

(58) Field of Classification Search
CPC .... G06F 3/0484; G05B 23/0272; H04L 67/10
See application file for complete search history.

(56) References Cited

U.S. PATENT DOCUMENTS

| 4,675,147 | A | * | 6/1987 | Schaefer | G21D 3/04 345/440 |
|---|---|---|---|---|---|
| 5,611,034 | A | * | 3/1997 | Makita | G06T 11/206 345/440 |
| 7,265,755 | B2 | | 9/2007 | Peterson | |
| 8,010,903 | B2 | | 8/2011 | Dieberger et al. | |
| 8,191,005 | B2 | | 5/2012 | Baier et al. | |
| 8,314,798 | B2 | | 11/2012 | Neelakantan et al. | |
| 8,838,417 | B2 | * | 9/2014 | Rikkola | G05B 23/0232 702/179 |
| 9,019,124 | B2 | * | 4/2015 | Schiff | G08B 23/00 340/3.43 |
| 2002/0077711 | A1 | * | 6/2002 | Nixon | C10G 11/187 700/51 |

(Continued)

*Primary Examiner* — Christopher E. Everett
(74) *Attorney, Agent, or Firm* — Eversheds-Sutherland (US) LLP

(57) ABSTRACT

This disclosure relates to systems and methods for processing and graphically displaying power plant data. In one embodiment, one or more values corresponding to one or more parameters associated with the performance of one or more power plant components may be received. A subset of the parameters associated with one or more operational characteristics based in part on the values may be determined. One or more display parameters may be selected that includes inputting at least a numerical range associated with at least one axis. The one or more parameter values in the subset may be scaled based in part on the inputted numerical range. A graphical representation may be generated and output on a graphical user interface that includes the one or more values within the numerical range on the at least one axis corresponding to each parameters in the subset based in part on the one or more display parameters.

20 Claims, 3 Drawing Sheets

(56) References Cited

U.S. PATENT DOCUMENTS

| | | | |
|---|---|---|---|
| 2002/0193969 A1* | 12/2002 | Frantz | F02C 9/00 |
| | | | 702/188 |
| 2004/0021695 A1* | 2/2004 | Sauermann | G06F 3/04847 |
| | | | 715/786 |
| 2005/0102284 A1* | 5/2005 | Srinivasan | G06F 17/30398 |
| 2007/0279417 A1* | 12/2007 | Garg | G06T 11/206 |
| | | | 345/440 |
| 2011/0292083 A1* | 12/2011 | Nihlwing | G05B 23/0272 |
| | | | 345/660 |
| 2012/0242648 A1 | 9/2012 | Baier et al. | |
| 2013/0097177 A1* | 4/2013 | Fan | G06F 17/30554 |
| | | | 707/748 |
| 2013/0176315 A1* | 7/2013 | Winkle | G06T 11/20 |
| | | | 345/440 |

* cited by examiner

SYSTEMS AND METHODS FOR PROCESSING AND GRAPHICALLY DISPLAYING POWER PLANT DATA

TECHNICAL FIELD

This disclosure generally relates to data processing, and more specifically relates to systems and methods for processing and graphically displaying power plant data.

BACKGROUND

Generally, one or more human machine interface (HMI) screens are used to display data related to devices and/or pieces of equipment in a power plant. Power plant operators may view the data to control and/or monitor the performance of the devices and/or equipment. However, the data displayed on each of the HMI screens typically only relates to a single parameter associated with the devices and/or equipment.

BRIEF DESCRIPTION OF THE DISCLOSURE

Embodiments are disclosed for systems and methods for processing and graphically displaying power plant data. According to one embodiment of the disclosure, there is disclosed a method. The method can include receiving one or more values corresponding to one or more parameters associated with the operation of one or more components of a power plant. The method can also include determining a subset of the one or more parameters associated with one or more operational characteristics based at least in part on the one or more values. The method can further include selecting one or more display parameters associated with graphically viewing the one or more values corresponding to the one or more parameters in the subset that includes inputting at least a numerical range associated with at least one axis. The method can also include scaling the one or more values corresponding to each of the one or more parameters in the subset based at least in part on the inputted numerical range. The method can further include generating a graphical representation to output on a graphical user interface that includes the one or more values within the numerical range on the at least one axis corresponding to each of the one or more parameters in the subset based at least in part on the one or more display parameters. The method can further include outputting the graphical representation to the graphical user interface.

According to another embodiment of the disclosure, there is disclosed a system. The system can include one or more processors with computer-executable instructions. The computer-executable instructions can be operable to receive one or more values corresponding to one or more parameters associated with the operation of one or more power plant components; determine a subset of the one or more parameters associated with one or more operational characteristics based at least in part on the one or more values; select one or more display parameters associated with viewing the one or more values corresponding to the one or more parameters in the subset that includes inputting at least a numerical range associated with at least one axis; scale the one or more values corresponding to each of the one or more parameters in the subset based at least in part on the inputted numerical range; generate a graphical representation to output on a graphical user interface that includes the one or more values within the numerical range on the at least one axis for each of the one or more parameters in the subset based at least in part on the one or more display parameters; and display the graphical representation on the graphical user interface.

According to another embodiment of the disclosure, there is disclosed a power plant that can include one or more power plant components that can include at least one or more gas turbines, steam turbines or pieces of equipment. The power plant can also include a monitoring system operable to monitor the performance of the one or more power plant components. The power plant can also include at least one processor that is in communication with the monitoring system, where the at least one processor is operable to receive, from the monitoring system, one or more values corresponding to one or more parameters associated with the operation of the one or more power plant components; determine a subset of the one or more parameters that are associated with one or more operational characteristics based at least in part on the one or more values; select one or more display parameters associated with viewing the one or more values corresponding to the one or more parameters in the subset; generate a graphical representation that displays on a graphical user interface the one or more values corresponding to the one or more parameters in the subset based at least in part on the one or more display parameters; and display the graphical representation on the graphical user interface.

Other embodiments, systems, methods, apparatus, aspects, and features of the disclosure will become apparent to those skilled in the art from the following detailed description, the accompanying drawings, and the appended claims.

These implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION OF THE DISCLOSURE

The disclosure relates to systems and methods for processing and graphically displaying power plant data. As an overview, a power plant may include one or more power plant components, such as, for example, a gas turbine, a steam turbine and/or one or more pieces of equipment. The power plant may further include a monitoring system operable to receive and transmit one or more values associated with one or more parameters corresponding to the operation of the power plant components to a processor associated with a control system. Based at least in part on the received parameter values, the processor may determine that a subset of the parameters is associated with one or more operational characteristics. The processor may further select one or more display parameters for graphically viewing the one or more values corresponding to each of the parameters in the subset that includes receiving at least a numerical range associated with at least one axis. The processor may scale the one or more values for each parameter in the subset based at least in part on the inputted numerical range. The processor may generate a graphical representation, such as a bar graph, a chart, or a table for viewing the values within the numerical range on the at least one axis for each parameter in the subset for display on a graphical user interface. Accordingly, values associated with more than one parameter in the subset may be displayed to a power plant operator on a single HMI screen.

The technical effects of certain embodiments of the disclosure may include enabling a power plant operator to view and compare the value of one or more parameters against each other, thereby reducing cycle time to analyze and determine causes of failures or malfunctions with respect to equipment of the power plant. Further technical effects of certain embodiments of the disclosure may include enabling early detection of malfunctions, abnormal conditions, and process deviations, thereby minimizing failures, tripping, and shutdown of the power plant or associated equipment.

Figure 1:
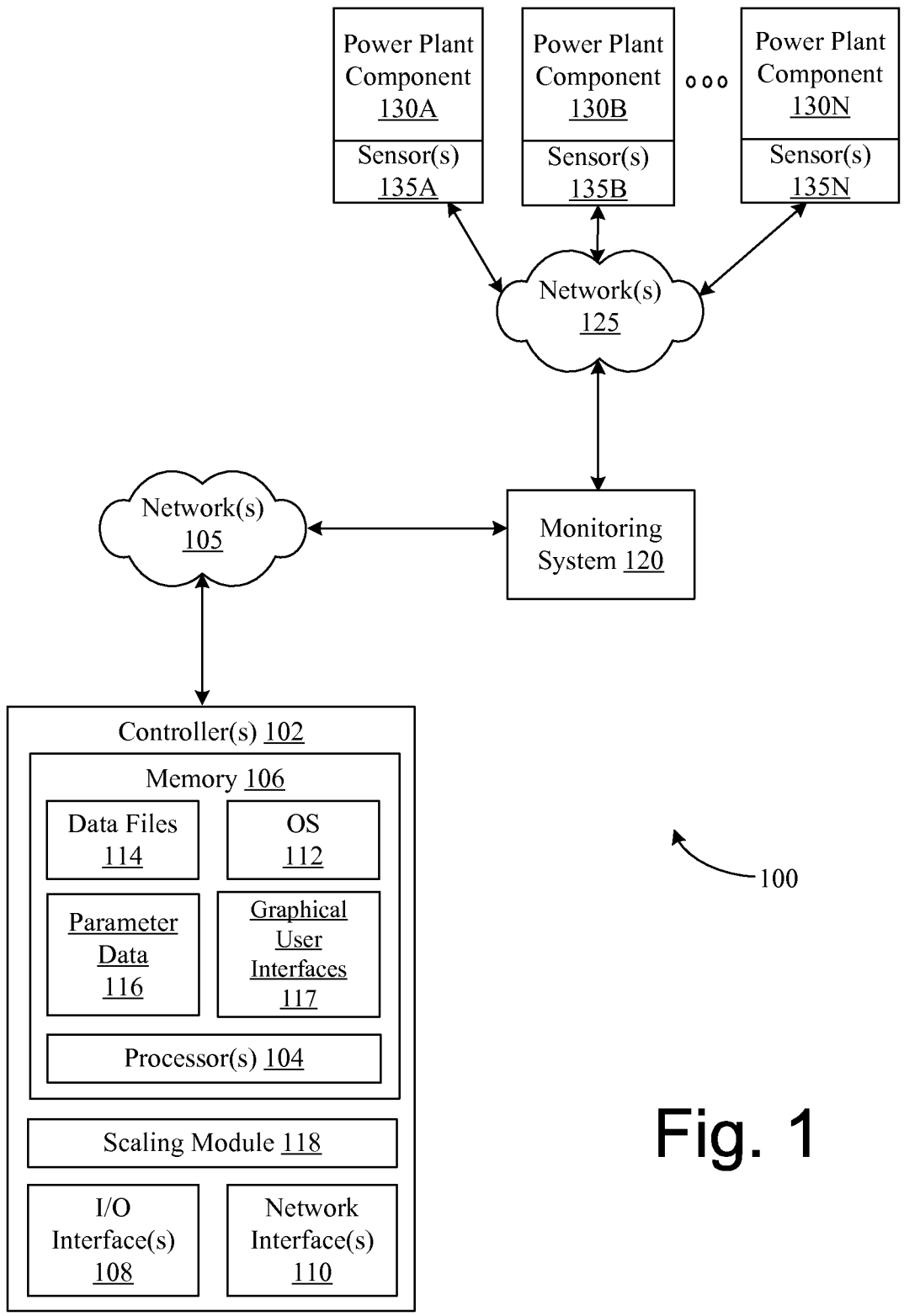
FIG. 1 is a block diagram of an example system for processing and graphically displaying power plant data, according to an embodiment of the disclosure.

Referring now to FIG. 1, shown is a block diagram of an example system 100 for processing and graphically displaying power plant data according to an embodiment of the disclosure. As shown in FIG. 1, the system 100 may include one or more power plant components 130A-130N, a monitoring system 120, and a control system or controller 102. The power plant components 130A-130N may include, for instance, a gas turbine, a steam turbine, and/or one or more pieces of equipment. The monitoring system 120 may be operable to monitor the operation of each of the power plant components 130A-130N via one or more sensors 135A-135N or other suitable monitoring devices. The one or more sensors 135A-135N may be operable to collect and transmit power plant data related to the operation of the one or more power plant components 130A-130N to the monitoring system 120 via network 125.

In certain embodiments, the one or more sensors, such as 135A-135N, may be operable to measure one or more values associated with one or more parameters corresponding to the operation of the one or more power plant components 130A-130N. For example, the one or more sensors 135A-135N may measure one or more values related to an operational temperature of one or more power plant components 130A-130N, one or more values related to an operational pressure in one or more power plant components 130A-130N, and so forth. The one or more sensors 135A-135N may then transmit the one or more values associated with each of the parameters to the monitoring system 120 via network 125.

Still referring to FIG. 1, the control system or controller 102 may include at least one processor 104 to facilitate processing and graphically displaying the one or more values associated with one or more of the parameters in the subset. To do so, the at least one processor 104 may be operable to receive, from the monitoring system via network 105, the one or more values associated with each of the one or more parameters as described above. Based at least in part on the values, the at least one processor 104 may be operable to determine a subset of the one or more parameters that share one or more operational characteristics, such as, for instance, a steam turbine thrust bearing temperature, a lube oil temperature, or a gas turbine exhaust temperature.

Upon identifying the subset of parameters, the at least one processor 104 may be operable to generate a graphical representation for each parameter in the subset. The graphical representation may include a graph for each parameter in the subset, where each of the graphs may share a common y-axis and are placed successively in a horizontal direction along an x-axis. In certain embodiments, the y-axis may include a range of values derived from the minimum and maximum value associated with the parameters.

Thereafter, the at least one processor 104 may be operable to output the graphical representation for display on a graphical user interface, where the graph for each parameter may fill with color to indicate a live value associated with the parameter. In addition, the at least one processor 104 may be operable to receive one or more updated values corresponding to each of the one or more parameters in the subset and generate an updated graphical representation displaying the graph for each parameter that indicates the one or more updated values.

In certain embodiments, the at least one processor 104 may generate the graphical representation based on one or more display parameters that may be received as input from, for instance, a user or power plant operator. As discussed further below with respect to FIG. 2, the one or more display parameters may include: selecting a type of graph, such as, for example, a bar graph, a chart, or a table; inputting a group name corresponding to the subset of parameters; and/or inputting a title associated with the graphical representation.

Additionally, in certain embodiments, the one or more display parameters may further include receiving, as input from a user, a numerical range corresponding to at least one axis. In one embodiment, the numerical range may correspond to the y-axis, where the numerical range identifies a range of numerical values associated with each of the parameters the user would like to be displayed. The at least one processor 104 and/or the scaling module 118 may scale the one or more values corresponding to each of the parameters in the subset based at least in part on the inputted numerical range. Thereafter, the at least one processor 104 may then generate a graphical representation to output on a graphical user interface that includes the graph that displays the one or more values within the numerical range on the y-axis based at least in part on the inputted numerical range.

Still referring to FIG. 1, the control system or controller 102 may further include one or more memories 106, one or more input/output ("I/O") interfaces 108, and one or more network interfaces 110. The control system or controller 102 may include other devices not depicted, according to other embodiments of the disclosure.

The at least one processor 104 may include one or more cores and can be configured to access and execute at least in part computer-executable instructions stored in the one or more memories 106. The one or more memories 106 can include one or more computer-readable storage media ("CRSM"). The one or more memories 106 may include, but are not limited to, random access memory ("RAM"), flash RAM, magnetic media, optical media, and so forth. The one or more memories 106 may be volatile in that information is retained while providing power or non-volatile in that information is retained without providing power.

The one or more I/O interfaces 108 may also be provided in each processor 104. These I/O interfaces 108 can allow for coupling a variety of input and/or output devices such as sensors, keyboards, mice, monitors, printers, external memories, and the like.

The one or more network interfaces 110 may provide for the transfer of data between the at least one processor 104 and another device directly such as in a peer-to-peer fashion, via a network, or both. The network interfaces 110 may include, but are not limited to, personal area networks ("PANs"), wired local area networks ("LANs"), wide area networks ("WANs"), wireless local area networks ("WLANs"), wireless wide area networks ("WWANs"), and so forth. The network interfaces 110 may utilize acoustic, radio frequency, optical, or other signals to exchange data between the at least one processor 104 and another device such as a smart phone, a tablet computer, a wearable computer, an access point, a host computer, and the like.

The one or more memories 106 may store parameter data 116 that includes the one or more values associated with the one or more parameters received from the monitoring system 120 as described above or other data, computer-executable instructions, or modules for execution by the at least one processor 104 to perform certain actions or functions, such as, for example, data files 114, an operating system ("OS") 112 and/or graphical user interfaces 117. The data files 114 may include any suitable data that facilitates operation of the at least one processor 104 including, but not limited to, operational information related to the performance of each of the power plant components 130A-130N. Additionally, the following modules are included by way of illustration, and not as a limitation. While the modules are depicted as stored in the one or more memories 106, in some implementations, these modules may be stored at least in part in external memory which is accessible to the at least one processor 104 via the network interfaces 110 or the I/O interfaces 108. These modules may include an operating system (OS) module 112 configured to manage hardware resources such as the I/O interfaces 108 and provide various services to applications or modules executing on the at least one processor 104.

Further, in certain embodiments, the at least one processor 104 may be operable to execute a scaling application program or scaling module 118 that may be stored in at least one memory 106. The scaling module 118 may be configured to change or scale at least one axis associated with a chart, graph, or table based on a range of numbers that may be input by a user or operator of a power plant as described above. For instance, the scaling module 118 can be operable to dynamically change, for instance, the y-axis associated with the graphs of each parameter at design time and/or at run time to achieve a zoom-in and/or zoom-out of the one or more values corresponding to the parameters in a subset. Thereafter, the at least one processor 104 and/or the scaling module 118 may generate one or more graphical representations to output on one or more graphical user interfaces 117 that displays to one or more users the one or more values associated with all of the parameters in the subset within the numerical range on the y-axis.

The at least one processor 104 described above with reference to FIG. 1 is provided by way of example only. As desired, numerous other embodiments, systems, methods, apparatus, and components may be utilized in accordance with certain embodiments of the disclosure.

Figure 2:
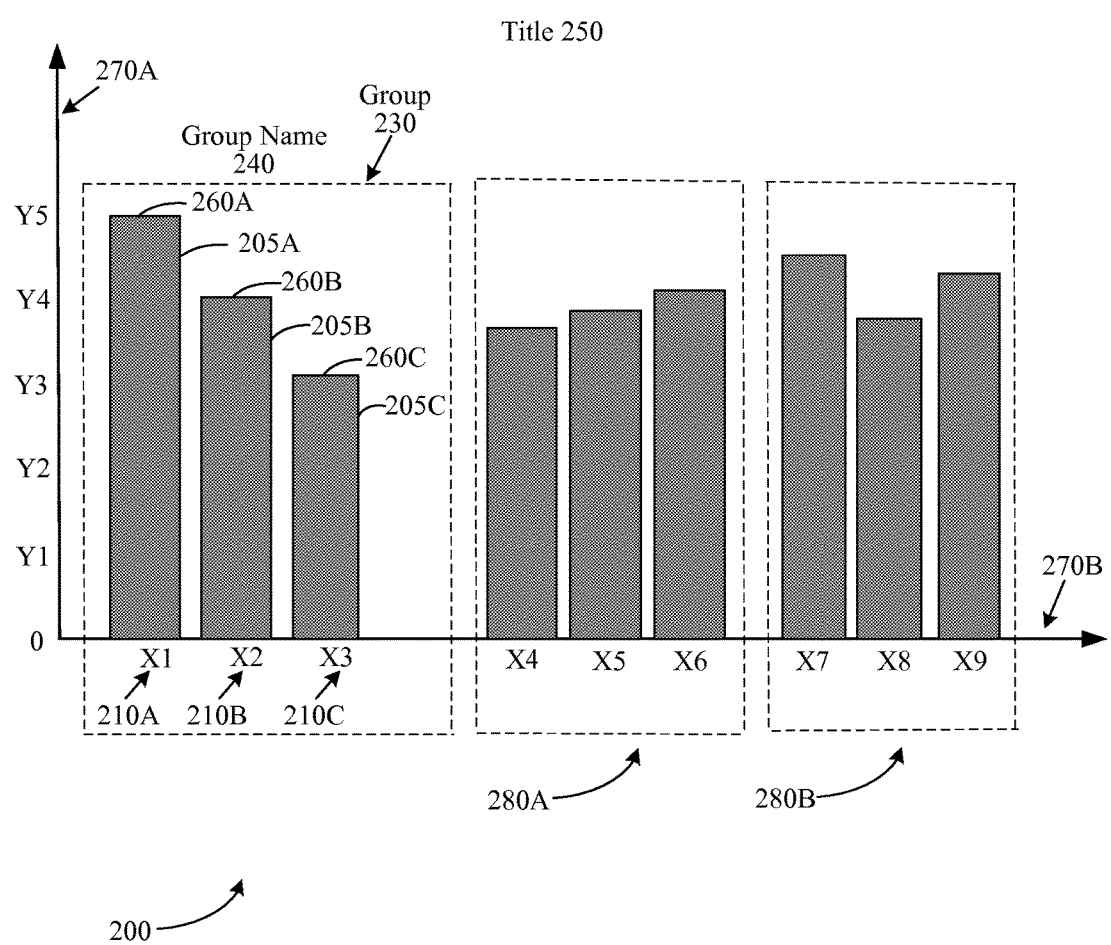
FIG. 2 is an example graphical representation displaying certain power plant data in accordance with an embodiment of the disclosure.

Referring now to FIG. 2, an example graphical representation is shown displaying certain power plant data in accordance with an embodiment of the disclosure. As shown in FIG. 2, a processor, such as the at least one processor 104 in FIG. 1, may generate a graphical representation 200 that includes, for example, one or more bar graphs 205A, 205B, 205C that correspond to respective parameters 260A, 260B, and 260C in a subset, or group 230, displaying one or more respective parameter values 210A, 210B, and 210C. As discussed above, the one or more bar graphs 205A, 205B, 205C may be placed successively along an x-axis 270B and share a common y-axis 270A that may be selectively scaled based on a range of values inputted by a user. Additionally, one or more additional display parameters may be selected or inputted by a user, such as, a title 250 and a group name 240 corresponding to the group 230 of parameters 260A, 260B, and 260C. Also, a user may select one or more additional subsets of one or more additional parameters 280A, 280B and the at least one processor 104 may update the graphical representation to further display the one or more additional subsets 280A, 280B.

Figure 3:
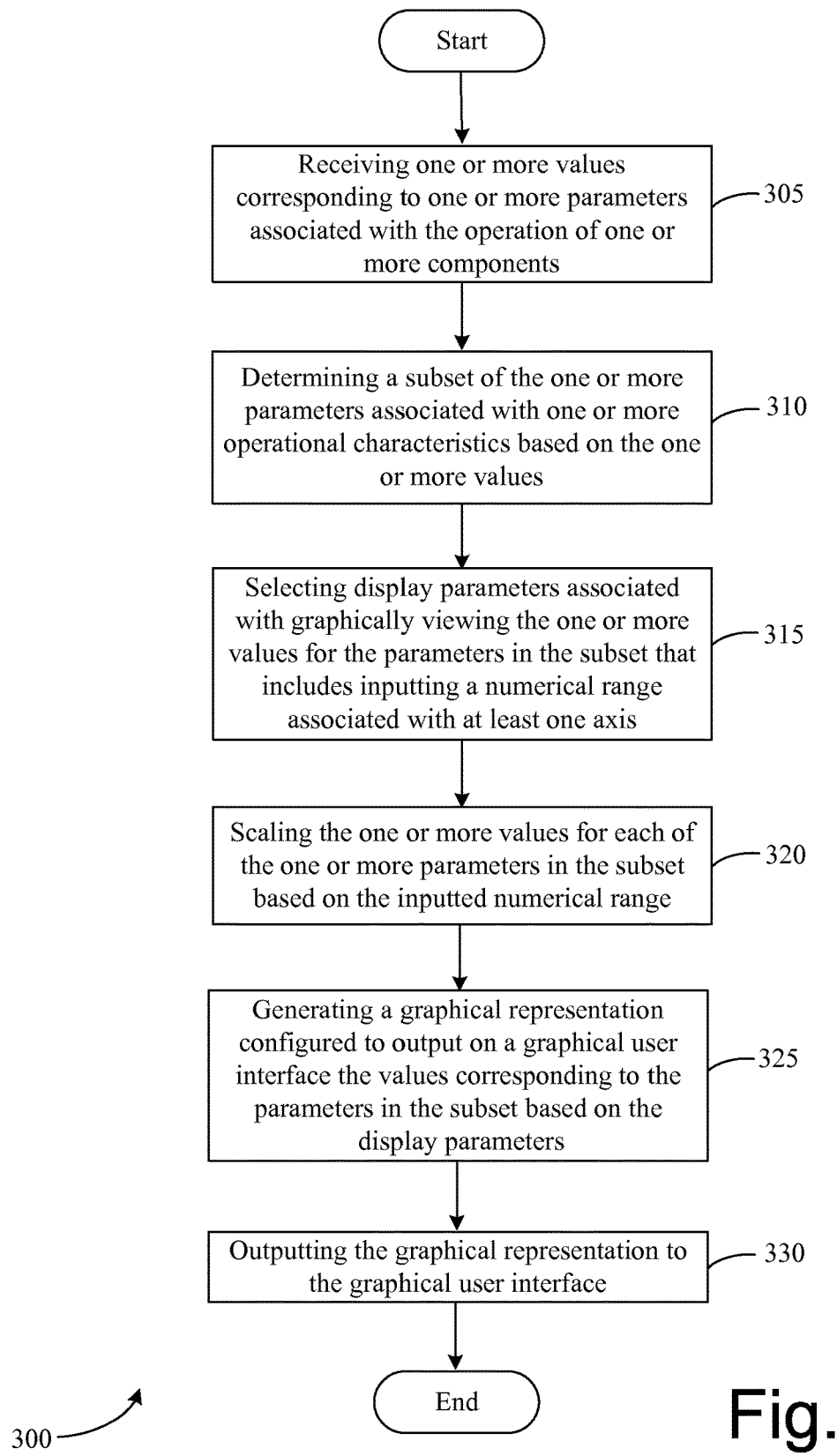
FIG. 3 is a flowchart illustrating an example method for processing and graphically displaying power plant data in accordance with an embodiment of the disclosure.

FIG. 3 illustrates an example method for processing and displaying power plant data in accordance with an embodiment of the disclosure.

In this particular implementation, the method 300 may begin at block 305, in which at least one processor may receive one or more values corresponding to one or more parameters associated with the operation and/or performance of one or more power plant components. As noted above, a processor, such as the at least one processor 104 in FIG. 1, may receive one or more values associated with the performance and/or operation of one or more power plant components, such as power plant components 130A-130N in FIG. 1, from a monitoring system, such as, monitoring system 120 in FIG. 1, via at least one network, such as network 105 in FIG. 1.

Block 305 is followed by block 310, in which based at least in part on one or more values associated with one or more parameters, a processor may determine a subset of the one or more parameters that are associated with one or more operational characteristics. For instance, a processor, such as the at least one processor 104 in FIG. 1, may determine that a subset of one or more power plant component, such 130A-130N in FIG. 1, share a common operational characteristic, such as a steam turbine thrust bearing temperature, a lube oil temperature, or a gas turbine exhaust temperature.

Block 310, is followed by block 315, in which one or more display parameters associated with graphically viewing the one or more values corresponding to the one or more parameters in the subset may be selected that includes at least a numerical range associated with at least one axis. For instance, a processor, such as the at least one processor 104 in FIG. 1, may receive as input from a user or a power plant the at least a numerical range associated with at least one axis.

Block 315, is followed by block 320, in which based at least in part the numerical range associated with at least one axis, a processor and/or a scaling module may scale one or more values corresponding to one or more parameters. For example, a processor, such as the at least one processor 104 in FIG. 1, and/or a scaling module, such as scaling module 118 in FIG. 1, may scale the one or more values based on the numerical range selected by a user or power plant operator as described above in block 315.

Block 320, is followed by block 325, in which based at least in part on one or more display parameters, a processor and/or a scaling module may generate a graphical representation operable to output on a graphical user interface one or more values within a numerical range on at least one axis corresponding to each of the one or more parameters in a subset. For example, a processor, such as the at least one processor 104 in FIG. 1, and/or a scaling module, such as scaling module 118 in FIG. 1, may generate a graphical representation to display to one or more users the one or more values associated with all of the parameters in the subset within the numerical range on the at least one axis. In this way, the graphical representation will enable the operator to compare the value of different parameters against each other as well.

Block 325, is followed by block 330, in which a processor, such as the at least one processor 104 in FIG. 1, and/or a scaling module, such as 118 in FIG. 1, may output a graphical representation as described above in block 325 to a graphical user interface, such as 117 in FIG. 1.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by processor-executable program instructions. Likewise, some blocks of the block diagrams and flow diagrams may not necessarily need to be performed in the order presented, or may not necessarily need to be performed at all, according to some implementations.

These processor-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed:

1. A method comprising:
   receiving, from two or more sensors by at least one processor, operation temperatures or pressures associated with at least two different operational parameters of a power plant;
   receiving, by at least one processor, an initial selection of a subset of the operation temperatures or pressures, wherein all of the operation temperatures or pressures in the initial selection of the subset share a common operational characteristic of temperature or pressure;
   receiving, by at least one processor, a selection of a numerical range between two numbers associated with at least one axis for viewing, via the interface, the operation temperatures or pressures in the initial selection of the subset;
   scaling, by at least one processor, the operation temperatures or pressures in the initial selection of the subset, wherein the operation temperatures or pressures are restricted to the selected numerical range between the two numbers; and
   generating, by at least one processor, a graphical representation of two or more bar graphs, charts, or tables output to a graphical user interface of the operation temperatures or pressures restricted to the selected numerical range, wherein the graphical representation of the two or more bar graphs, charts, or tables is sized to fit the initial selection of the subset of the operation temperatures or pressures on the interface.

2. The method of claim 1, wherein the operation temperatures or pressures are received from a monitoring system configured to monitor performance of one or more components of the power plant.

3. The method of claim 1, wherein the power plant comprises at least one of: (i) one or more gas turbines, (ii) one or more steam turbines, or (iii) one or more pieces of equipment.

4. The method of claim 1, wherein the common operational characteristic of temperature or pressure comprises at least one of: (i) a steam turbine thrust bearing temperature, (ii) a lube oil temperature, or (iii) a gas turbine exhaust temperature.

5. The method of claim 1, wherein selecting a numerical range associated with at least one axis comprises selecting a graph type that comprises at least one of: (i) a bar graph, (ii) a chart, or (iii) a table.

6. The method of claim 1, wherein the graphical representation outputs at least one live real time value for the operation temperatures or pressures in the subset.

7. The method of claim 1, further comprising:
   receiving updated values corresponding to the operation temperatures or pressures in the subset;
   generating an updated graphical representation based at least in part on the updated values to output to the graphical user interface.

8. The method of claim 1, further comprising:
   selecting an additional subset comprising additional operation temperatures or pressures;

updating the graphical representation based at least in part on the additional subset to output to the graphical user interface.

9. The method of claim 1, further comprising:
receiving an input of a subset name associated with the subset of operation temperatures or pressures; and
outputting the subset name adjacent to the graphical representation on the graphical user interface.

10. A system comprising:
at least one memory operable to store computer-executable instructions; and
at least one processor configured to access the at least one memory and execute the computer-executable instructions to:
receive, from two or more sensors, values corresponding to respective operation temperatures or pressures associated with at least two operational parameters of a power plant;
receive an initial selection of a subset of operation parameters, wherein all of the operation temperatures or pressures of the initial selection of the subset share a common operational characteristic of temperature or pressure;
receive a selection of a numerical range between two numbers associated with at least one axis for viewing operation temperatures or pressures in the initial selection of the subset;
scale the operation temperatures or pressures in the initial selection of the subset, wherein the operation temperatures or pressures are restricted to the selected numerical range between the two numbers; and
generate a graphical representation of two or more bar graphs, charts, or tables output on a graphical user interface the operation temperatures or pressures restricted to the selected numerical range, wherein the graphical representation of the two or more bar graphs, charts, or tables is sized to fit the initial selection of the subset of the operation temperatures or pressures on the interface.

11. The system of claim 10, wherein the operation temperatures or pressures are received from a monitoring system configured to monitor performance of one or more components of the power plant.

12. The system of claim 10, wherein the common operational characteristic of temperature or pressure comprises at least one of: (i) a steam turbine thrust bearing temperature, (ii) a lube oil temperature, or (iii) a gas turbine exhaust temperature.

13. The system of claim 10, wherein to select a subset of operation temperatures or pressures comprises at least one of: (i) to input a name associated with the subset, or (ii) to select a name associated with the subset.

14. The system of claim 10, wherein the graphical representation includes at least one real time value for each of the operation temperatures or pressures in the subset.

15. The system of claim 10, wherein the processor is further operable to:
receive updated values corresponding to the operation temperatures or pressures in the subset;
generate an updated graphical representation to display the updated values via the graphical user interface.

16. The system of claim 10, wherein the processor is further operable to:
select an additional subset of the operation temperatures or pressures;
update the graphical representation to display the additional subset via the graphical user interface.

17. The system of claim 10, wherein the processor is further operable to:
receive as input a subset name associated with the subset of operation temperatures or pressures; and
display the subset name adjacent to the graphical representation on the graphical user interface.

18. A power plant comprising:
one or more power plant components comprising at least one of: (i) gas turbines, (ii) steam turbines, or (iii) equipment;
a monitoring system, wherein the monitoring system is configured to monitor performance of the one or more power plant components; and
at least one processor, wherein the at least one processor is in communication with the monitoring system and operable to:
receive, from two or more sensors associated with the monitoring system, operation temperatures or pressures associated with at least two operational parameters of the power plant components;
determine a subset of the operation temperatures or pressures, wherein all of the operation temperatures or pressures of the subset share a common operational characteristic of temperature or pressure;
select a numerical range between two numbers associated with at least one axis for viewing the subset of operation temperatures or pressures corresponding to the respective operation temperatures or pressures in the subset; and
generate a graphical representation of two or more bar graphs, charts, or tables output on a graphical user interface the subset of operation temperatures or pressures restricted to the selected numerical range between the two numbers, wherein the graphical representation of the two or more bar graphs, charts, or tables is sized to fit the subset of the operation temperatures or pressures on the interface.

19. The power plant of claim 18, wherein the at least one processor is further operable to:
receive updated values corresponding to the operation temperatures or pressures in the subset;
generate an updated graphical representation displaying the updated values corresponding to the operation temperatures or pressures in the subset; and
display the updated graphical representation on the graphical user interface.

20. The power plant of claim 18, wherein the at least one processor is further operable to:
select additional subsets of the operation temperatures or pressures;
update the graphical representation to further display the additional subsets; and
display the updated graphical representation on the graphical user interface.

* * * * *